(12) United States Patent
Wang (10) Patent No.: US 11,913,754 B2
(45) Date of Patent: Feb. 27, 2024

(54) TELESCOPIC SIGHT FOR DETACHABLY CONNECTING NIGHT VISON DEVICE AND NIGHT VISION EQUIPMENT

(71) Applicant: Peng Wang, Yueyang (CN)

(72) Inventor: Peng Wang, Yueyang (CN)

( * ) Notice: Subject to any disclaimer, the term of this patent is extended or adjusted under 35 U.S.C. 154(b) by 0 days.

(21) Appl. No.: 18/319,028

(22) Filed: May 17, 2023

(65) Prior Publication Data

US 2023/0288172 A1  Sep. 14, 2023

(51) Int. Cl.
*F41G 1/38* (2006.01)
*G02B 23/12* (2006.01)
*F41G 1/32* (2006.01)

(52) U.S. Cl.
CPC ............... *F41G 1/38* (2013.01); *G02B 23/12* (2013.01); *F41G 1/32* (2013.01)

(58) Field of Classification Search
CPC .. F41G 1/38; F41G 1/32; G02B 23/12; G02B 23/125; G02B 23/16
USPC .............................................. 359/209.1, 209
See application file for complete search history.

(56) References Cited

U.S. PATENT DOCUMENTS

| | | | |
|---|---|---|---|
| 9,285,189 B1* | 3/2016 | Zhang | F41G 3/142 |
| 2003/0053205 A1 | 3/2003 | Swarovski | |
| 2009/0141371 A1* | 6/2009 | Brown | G02B 7/026 |
| | | | 359/811 |
| 2011/0099881 A1 | 5/2011 | Jung et al. | |
| 2012/0224115 A1 | 9/2012 | Trissel et al. | |
| 2015/0241171 A1* | 8/2015 | Theisinger | F41G 1/38 |
| | | | 42/130 |
| 2018/0224652 A1* | 8/2018 | Havens | G02B 27/10 |
| 2022/0163757 A1* | 5/2022 | Wang | G02B 7/14 |

* cited by examiner

Primary Examiner — Balram T Parbadia
Assistant Examiner — Rahman Abdur
(74) Attorney, Agent, or Firm — Zhigang Ma

(57) ABSTRACT

A telescopic sight for detachably connecting a night vision device includes a first external barrel, a regulation element, a first lens module and a transmission module. The first external barrel includes at least one opening, and an end of the first external barrel is configured for detachably connecting the night vision device. The regulation element is disposed on the first external barrel. The first lens module is located at an inner side of the first external barrel. The transmission module is connected between the regulation element and the first lens module via the at least one opening. When the regulation element is driven by an external force, the regulation element drives the transmission module move along an optical axis of the telescopic sight, such that the transmission module drives the first lens module moves along the optical axis to regulate focal length of the telescopic sight.

14 Claims, 4 Drawing Sheets

TELESCOPIC SIGHT FOR DETACHABLY CONNECTING NIGHT VISON DEVICE AND NIGHT VISION EQUIPMENT

TECHNICAL FIELD

The present disclosure relates to the technical field of telescopes, in particular to a telescopic sight for detachably connecting a night vision device and a night vision equipment with the telescopic sight.

BACKGROUND

A night vision equipment is widely used to observe a terrain, scout an enemy's situation, roughly measure a direction angle, an elevation, a deviation of point of impact and the like of an object distance during night, and the telescope is also used for tourism, viewing, watching, etc., so the telescope plays an important role in people's life.

The night vision equipment usually has a night vision device and a telescopic sight for detachably connecting the night vision device. However, when the telescopic sight is installed on the night vision device, it is hard to regulate focal length of the telescopic sight.

SUMMARY

In order to overcome deficiencies of the prior art, the present disclosure provides a telescopic sight for detachably connecting the night vision device and a night vision equipment with the telescopic sight, and the telescopic sight for detachably connecting the night vision device has a simple structure, and the focal length of the telescopic sight is convenient to regulate the focal length when the telescopic sight is installed on the night vision device.

The technical solution adopted by the present disclosure to solve the technical problem is as follows: a telescopic sight for detachably connecting a night vision device including a first external barrel including at least one opening passing through a side wall of the first external barrel, and an end of the first external barrel configured for detachably connecting the night vision device; a regulation element disposed on the first external barrel; a first lens module located at an inner side of the first external barrel; and a transmission module including a transmission element and at least one connection element, the transmission element connected between the regulation element and the at least one connection element, and the at least one connection element passing through the at least one opening and connected between the transmission element and the first lens module, wherein when the regulation element is driven by an external force, the regulation element drives the transmission module move along an optical axis of the telescopic sight, such that the at least one connection element slides along the opening and the first lens module moves along the optical axis to regulate focal length of the telescopic sight.

In one embodiment, the regulation element includes a regulation ring sleeved on the first external barrel, the regulation ring includes a first inner screw thread, and the transmission element includes a transmission ring with a first external screw thread coordinated with the first inner screw thread, when the regulation ring rotates around the optical axis O-O, due to the first external screw thread and the first inner screw, the at least one connection element and the first lens module are driven by the transmission element along the optical axis O-O.

In one embodiment, the first lens module includes an inner barrel and at least one lens disposed in the inner barrel, each connection element includes a connection pole, the regulation ring includes a first fixing hole, the inner barrel includes a second fixing hole, two ends of the connection pole are fixed in the first fixing hole and the second fixing hole respectively.

In one embodiment, the at least one connection element includes a plurality of connection elements, the at least on opening includes a plurality of connection openings corresponding to the plurality of connection elements respectively, each connection element passes though the corresponding opening and is connected between the transmission ring and the first lens module.

In one embodiment, the plurality of connection openings are located at an circumference of the first external barrel at equal intervals, the plurality of connection elements are connected to the transmission ring and the first lens module at equal intervals.

In one embodiment, a plurality of skipproof strips are disposed on an external surface of the first external barrel, and each skipproof strip is ring-shaped and perpendicular to the optical axis.

In one embodiment, the telescopic sight further includes a second external barrel, the second external barrel is connected the other end away from the night vision device and configured for connecting a second lens module, the first lens module is an eyepiece module, and the second lens module is an objective module.

In one embodiment, the first external barrel includes a first part, a second part and a third part, the first part is configured for detachably connecting the night vision device, the second part is connected between the first part and the third part, the at least one opening is located at the second part, an end of the second external barrel is sandwiched between the third part and regulation ring, the other end of the second external barrel is configured for connecting the second lens module.

In one embodiment, an external surface of the second part includes a main surface connected to an external surface of the third part, a first connection surface connected to the main surface away from the third part, a first supporting surface connected to the first connection surface away from the main surface, and a second connection surface connected between an external surface of the first part and the first supporting surface, the first connection surface and the main surface form a first restriction groove, the opening passes through the main surface and an inner surface of the second part, the transmission element is located at the first restriction groove, the first supporting surface and the second connection surface forms a second restriction groove, an external surface of the end of the second external barrel includes a second supporting surface and a third connection surface connected to the second supporting surface, the regulation element is located at the second restriction groove, two ends of the regulation element abut the second connection surface and the third connection surface such that the regulation element is restricted between the second connection surface and the third connection surface.

In one embodiment, an external surface of the third part includes a second external screw thread, the end of the second external barrel includes a second inner screw thread coordinated with the second external screw thread.

In one embodiment, the other end of the second external barrel includes a third inner screw thread, and the second lens module includes a third external screw thread coordinated with the third inner screw thread.

In one embodiment, the telescopic sight includes a third external barrel, an end of the third external barrel sleeves on the other end of second external barrel, the other end of the third external barrel sleeves on the second lens module.

In one embodiment, a first sealing slot is provided on the first supporting surface, and a first sealing ring is located in the first sealing slot and sandwiched between a bottom surface of the first sealing slot and the regulation ring; a second sealing slot is provided on the second supporting surface, and a second sealing ring is located in the second sealing slot and sandwiched between a bottom surface of the second sealing slot and the regulation ring.

In one embodiment, a third sealing slot is provided on an external surface of the second external barrel, and a third sealing ring is located in the third sealing slot and sandwiched between a bottom surface of the third sealing slot and the third external barrel; a fourth sealing slot is provided on an external surface of the second lens module, and a fourth sealing ring is located in the fourth sealing slot and sandwiched between a bottom surface of the fourth sealing slot and the third external barrel.

In one embodiment, the at least one opening extends along the optical axis and is configured for restricting the at least one connection element to move along the optical axis.

The technical solution also adopted by the present disclosure to solve the technical problem is as follows: a night vision equipment including a night vision device and a telescopic sight for detachably connecting the night vision device, the telescopic sight including a first external barrel, a regulation element, a first lens module and a transmission module, the first external barrel including at least one opening passing through a side wall of the first external barrel, an end of the first external barrel configured for detachably connecting the night vision device; the regulation element disposed on the first external barrel; the first lens module located at an inner side of the first external barrel, the transmission module including a transmission element and at least one connection element, the transmission element connected between the regulation element and the at least one connection element, and the at least one connection element passing through the at least one opening and connected between the transmission element and the first lens module, wherein when the regulation element is driven by an external force, the regulation element drives the transmission module move along an optical axis of the telescopic sight, such that the at least one connection element slides along the opening and the first lens module moves along the optical axis to regulate focal length of the telescopic sight.

In one embodiment, the first external barrel includes a first snap portion located at an end of the first external barrel adjacent to the night vision device, the night vision device includes a second snap portion for detachably connecting the first snap portion, one of the first snap portion and the second snap portion includes a block, the other one of the first snap portion and the second snap portion includes a guiding groove and a fastener groove communicating with the guiding groove, the block is configured for sliding into the fastener groove via the guiding groove to connect the night vision device and the telescopic sight The technical solution further adopted by the present disclosure to solve the technical problem is as follows: a telescopic sight for detachably connecting a night vision device including a first external barrel including at least one opening passing through a side wall of the first external barrel, and an end of the first external barrel configured for detachably connecting the night vision device; a regulation element disposed on the first external barrel; a first lens module located at an inner side of the first external barrel; and a transmission module including connected between the regulation element and the first lens module via the at least one opening, wherein when the regulation element is driven by an external force, the regulation element drives the transmission module move along an optical axis of the telescopic sight, such that the transmission module drives the first lens module moves along the optical axis to regulate focal length of the telescopic sight.

Beneficial effects: through the above structure, when the regulation element is driven by an external force, the regulation element can drive the the first lens module via the transmission module move along the optical axis to regulate focal length of the telescopic sight, the first external barrel which is connected with the night vision device does not need to move, thus, it is convenient to regulate the focal length of the telescopic sight when the first external barrel is installed on the night vision device. Furthermore, the telescopic sight is simple in structure, convenient to use and reasonable in design.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 1:
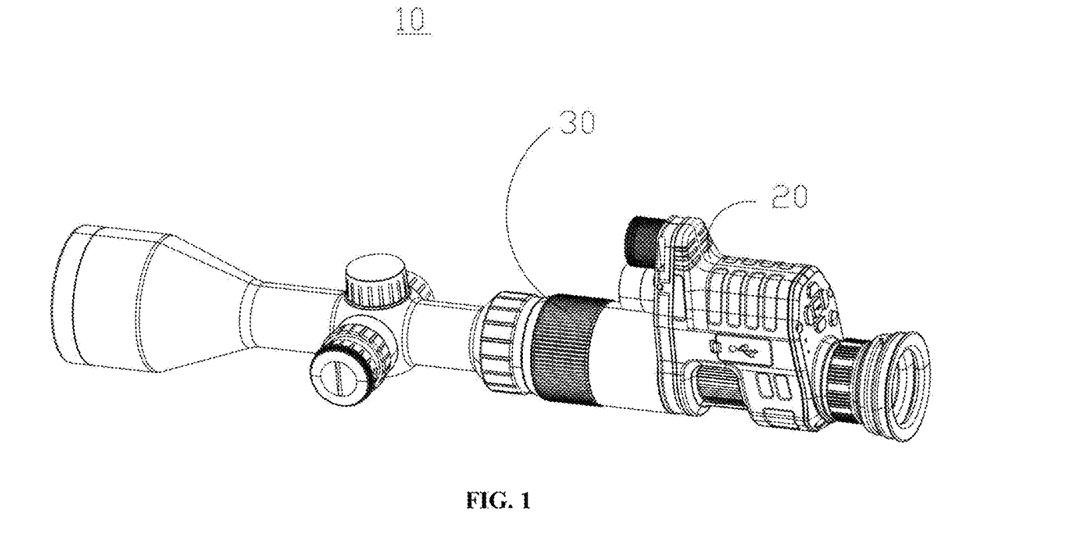
FIG. 1 is a schematic diagram of a night vision equipment according to an embodiment of the present disclosure.
Figure 2:
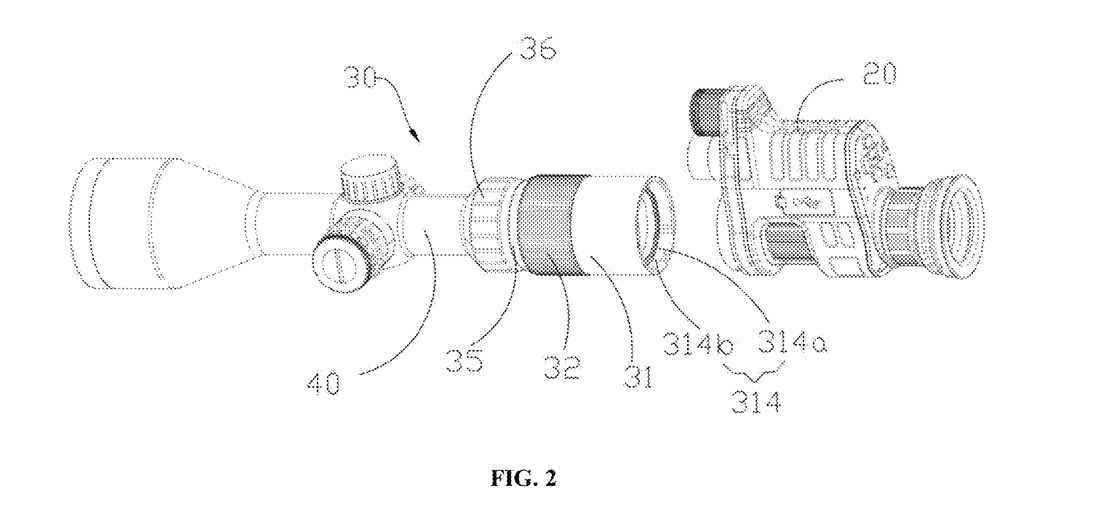
FIG. 2 is an explode diagram of the night vision equipment of FIG. 1.
Figure 3:
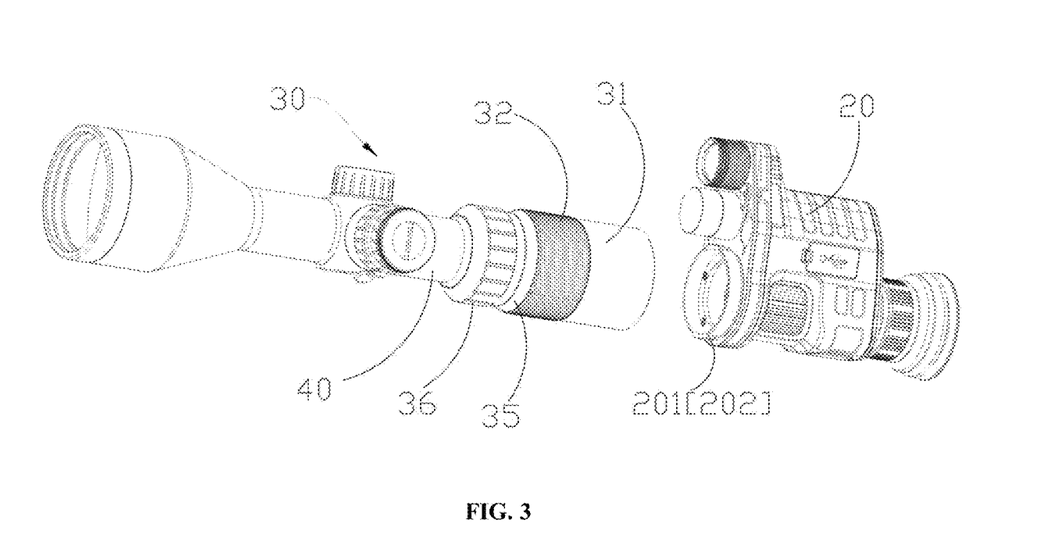
FIG. 3 is another explode diagram of the night vision equipment of FIG. 1.

Referring to FIG. 1~FIG. 3, an embodiment of the present disclosure provides a night vision equipment 10. The night vision equipment 10 includes a night vision device 20 and a telescopic sight 30 for detachably connecting the night vision device 20.

Referring to FIG. 4~FIG. 7, the telescopic sight 30 includes a first external barrel 31, a regulation element 32, a first lens module 33 and a transmission module 34. The first external barrel 31 includes at least one opening 310 passing through a side wall of the first external barrel 31. An end of the first external barrel 31 is configured for detachably connecting the night vision device 20. The regulation element 32 is disposed on the first external barrel 31. The first lens module 33 is located at an inner side of the first external barrel 31. The transmission module 34 includes a transmission element 341 and at least one connection element 342. The transmission element 341 is connected between the regulation element 32 and the at least one connection element 342, and the at least one connection element 342 passes through the at least one opening 310 and connected between the transmission element 341 and the first lens module 33.

When the regulation element 32 is driven by an external force, the regulation element drives the transmission module 34 move along an optical axis O-O of the telescopic sight 30, such that the at least one connection element 342 slides along the opening 310 and the first lens module 33 moves along the optical axis to regulate focal length of the telescopic sight 30.

In the telescopic sight 30, the regulation element 32 is driven by an external force, the regulation element 32 can drive the the first lens module 33 via the transmission module 34 move along the optical axis O-O to regulate focal length of the telescopic sight 30, the first external barrel 31 which is connected with the night vision device 20 does not need to move, thus, it is convenient to regulate the focal length of the telescopic sight 30 when the first external barrel 31 is installed on the night vision device 20. Furthermore, the telescopic sight 30 is also simple in structure, convenient to use and reasonable in design.

In the embodiment, the regulation element 32 includes a regulation ring 320 sleeved on the first external barrel 31, and the regulation ring 320 includes a first inner screw thread 321. The transmission element 341 includes a transmission ring 343 with a first external screw thread 344 coordinated with the first inner screw thread 321. When a user rotates the regulation ring 320 around the optical axis O-O, due to the first external screw thread 344 and the first inner screw 321, the at least one connection element 342 and the first lens module 33 are driven by the transmission element 34 along the optical axis O-O.

Through the regulation ring 320 with the first inner screw thread 321 and the transmission ring 343 with the first external screw thread 344, it is convenient to regulate the focal length of the telescopic sight 30 when the first external barrel 31 is installed on the night vision device 20. Furthermore, the regulation ring 320 and transmission ring 343 are also simple in structure, convenient to use and reasonable in design.

In the embodiment, the first lens module 33 includes an inner barrel 331 and at least one lens 301 disposed in the inner barrel 331. Each connection element 342 includes a connection pole 345, the regulation ring 320 includes a first fixing hole 346. The inner barrel 331 includes a second fixing hole 333, two ends of the connection pole 345 are fixed in the first fixing hole 346 and the second fixing hole 333 respectively. Through the connection pole 345, the first fixing hole 346 and the second fixing hole 333, the regulation ring 320 and the inner barrel 331 can be connected to each other steadily, and it is convenient to assemble the regulation ring 320 and the inner barrel 331.

The at least one connection element 342 may include a plurality of connection elements 342a, the at least on opening 310 includes a plurality of connection openings 310a corresponding to the plurality of connection elements 342a respectively, each connection element 342 passes though the corresponding opening 310a and is connected between the transmission ring 343 and the first lens module 33. In the embodiment, a number of the plurality of connection elements 342a and a number of the plurality of opening 310a are three, and the plurality of connection openings 310a are located at an circumference of the first external barrel 31 at equal intervals, the plurality of connection elements 342a are connected to the transmission ring 343 and the first lens module 33 at equal intervals. Though the above structure, a stability during the focal length regulation can be ensured.

Furthermore, a plurality of skipproof strips 347 are disposed on an external surface of the first external barrel 31, and each skipproof strip 347 is ring-shaped and perpendicular to the optical axis O-O. Though the skipproof strips 347, it is convenient to rotate the regulation ring 320.

The telescopic sight 30 includes a second external barrel 35, and the second external barrel 35 is connected the other end away from the night vision device 20 and configured for connecting a second lens module 40, the first lens module 33 can be an eyepiece module having at least one first lens 301, and the second lens module 40 can be an objective module having at least one second lens 402.

The first external barrel 31 includes a first part 311, a second part 312 and a third part 313. The first part 311 is configured for detachably connecting the night vision device 20, the second part 312 is connected between the first part 311 and the third part 313, the at least one opening 310 is located at the second part 312, an end of the second external barrel 35 is sandwiched between the third part 313 and the regulation ring 320, the other end of the second external barrel 35 is configured for connecting the second lens module 40.

Figure 6:
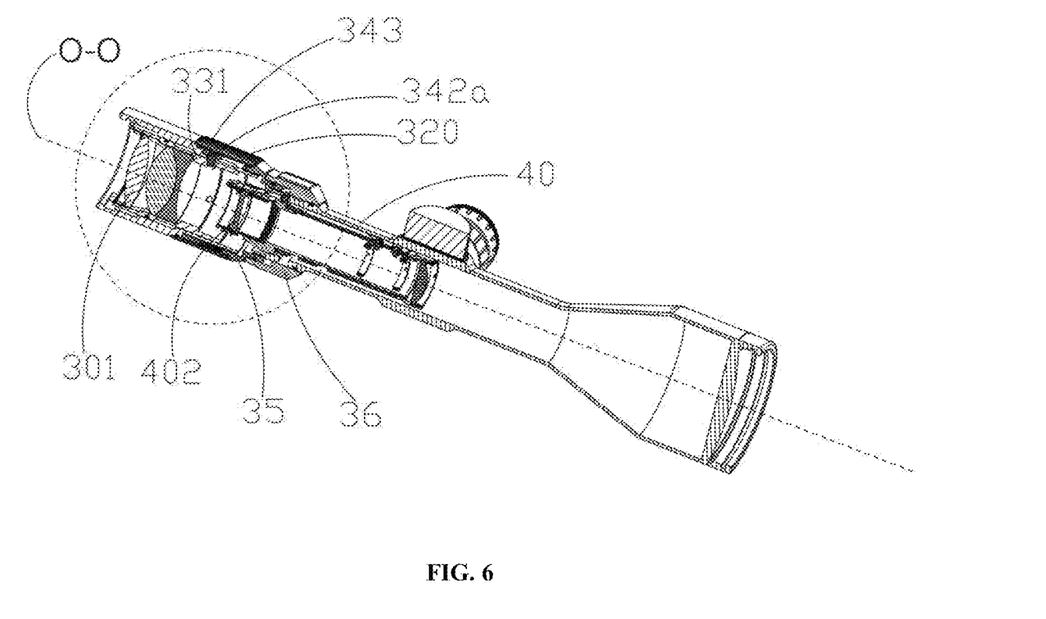
FIG. 6 is a cross-sectional view of the telescopic sight of FIG. 4.
Figure 7:
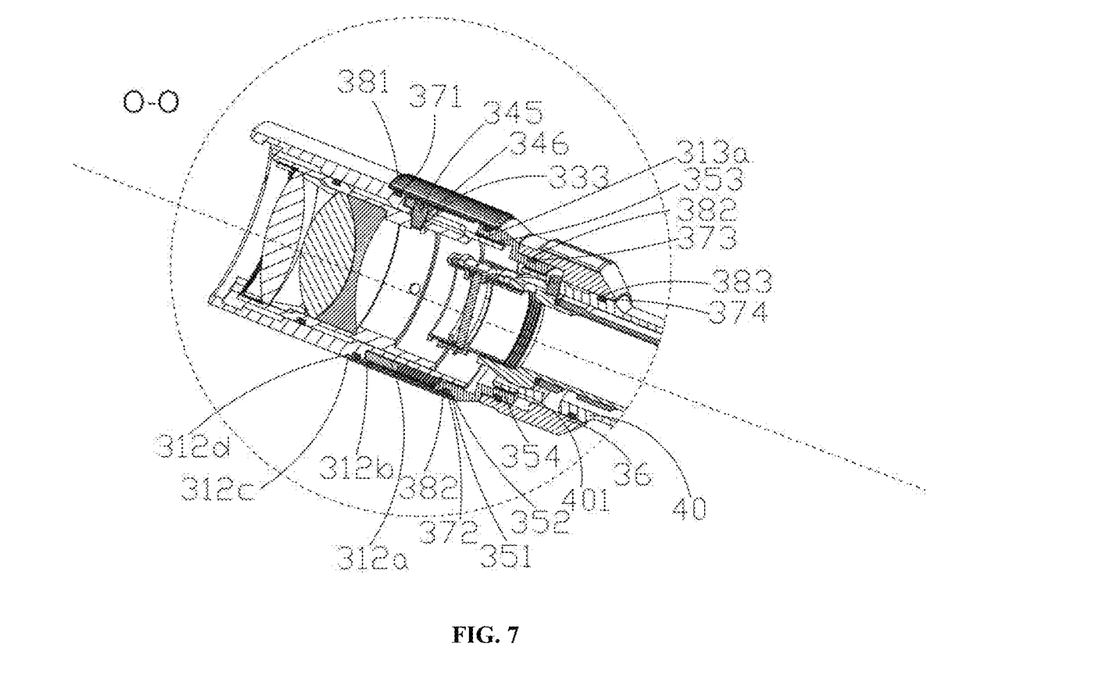
FIG. 7 is an enlarged view of a part A in FIG. 6.

An external surface of the second part 312 includes a main surface 312a connected to an external surface of the third part 313, a first connection surface 312b connected to the main surface 312a away from the third part 313, a first supporting surface 312c connected to the first connection surface 312b away from the main surface 312a, and a second connection surface 312d connected between an external surface of the first part 311 and the first supporting surface 312c. The first connection surface 312b and the main surface 312a form a first restriction groove (not labeled), the opening 310a passes through the main surface 312a and an inner surface of the second part 312. The transmission element 341 is located at the first restriction groove 312e. The first supporting surface 312c and the second connection surface 312d forms a second restriction groove (not labeled), an external surface of the end of the second external barrel 35 includes a second supporting surface 351 and a third connection surface 352 connected to the second supporting surface 351, the regulation element 341 is located at the second restriction groove 312f. Two ends of the regulation element 341 abut the second connection surface 312d and the third connection surface 352 such that the regulation element 341 is restricted between the second connection surface 312d and the third connection surface 352. Though the above structure, the regulation element 341 does not move along the optical axis O-O during rotating, the stability during the focal length regulation can be improved.

In the embodiment, an external surface of the third part 313 includes a second external screw thread 313a, the end of the second external barrel 35 includes a second inner screw thread 353 coordinated with the second external screw thread 313a. Though the above structure, the first external barrel 31 and the second external barrel 35 are connected to each other easily and steadily.

In the embodiment, the other end of the second external barrel 35 includes a third inner screw thread 354, and the second lens module 40 includes a third external screw thread 401 coordinated with the third inner screw thread 354. Though the above structure, the second external barrel 35 and the second lens module 40 are connected to each other easily and steadily.

Figure 4:
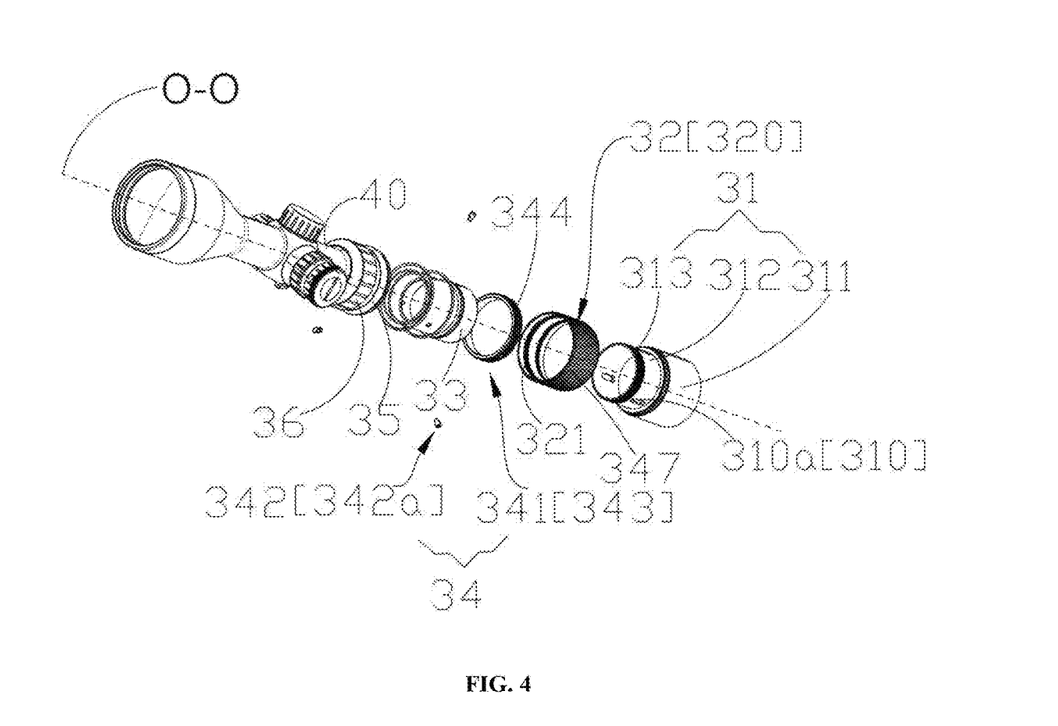
FIG. 4 is an explode diagram of a telescopic sight of the night vision device of FIG. 1.
Figure 5:
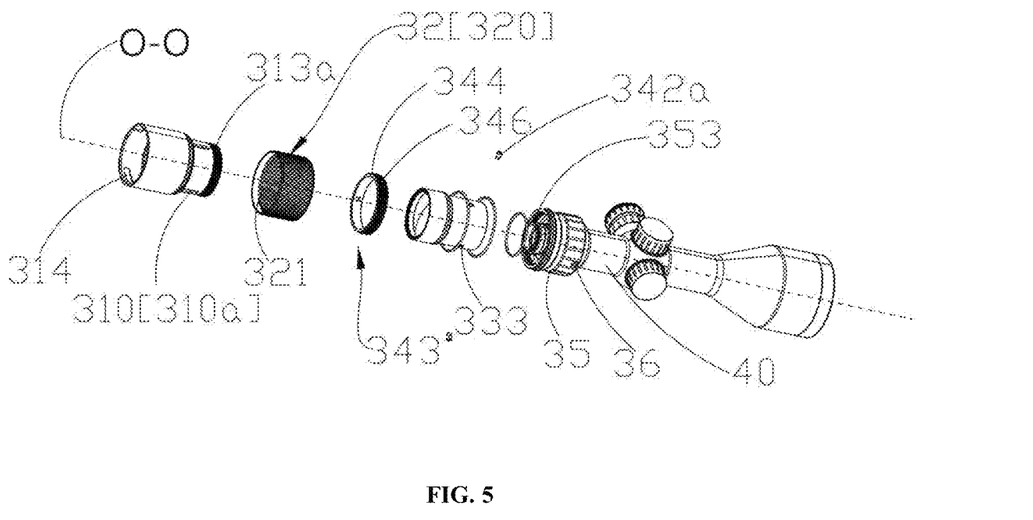
FIG. 5 is another explode diagram of the telescopic sight of FIG. 4.

In the embodiment, the telescopic sight 30 includes a third external barrel 36, an end of the third external barrel 36 sleeves on the other end of second external barrel 35, the other end of the third external barrel 36 sleeves on the second lens module 40.

A first sealing slot 371 is provided on the first supporting surface 312c, and a first sealing ring 381 is located in the first sealing slot 371 and sandwiched between a bottom surface of the first sealing slot 371 and the regulation ring 320. A second sealing slot 372 is provided on the second supporting surface 351, and a second sealing ring 382 is located in the second sealing slot 372 and sandwiched between a bottom surface of the second sealing slot 372 and the regulation ring 320.

A third sealing slot 373 is provided on an external surface of the second external barrel 35, and a third sealing ring 383 is located in the third sealing slot 373 and sandwiched between a bottom surface of the third sealing slot 373 and the third external barrel 36. A fourth sealing slot 374 is provided on an external surface of the second lens module 40, and a fourth sealing ring 384 is located in the fourth sealing slot 374 and sandwiched between a bottom surface of the fourth sealing slot 374 and the third external barrel 36.

Through the above sealing rings 371~374 are respectively arranged in the above sealing slots 381-384, sealing performance of the telescopic sight 30 is improved, the stability of the telescopic sight 30 is ensured and service life of the telescopic sight 30 is prolonged.

It can be understood, the opening 310a extends along the optical axis O-O, a width of the opening 310a is substantially equal to a diameter of the corresponding connection element 342a, such that the opening 310a can restrict the corresponding connection element 342a to move along the optical axis O-O, thus, the stability during the focal length regulation can be further improved.

Referring to FIG. 2~FIG. 3, the first external barrel 31 includes at least one first snap portion 314 located at an end of the first external barrel 31 adjacent to the night vision device 20. The night vision device 20 includes at least one second snap portion 201 for detachably connecting the first snap portion 314. One of the first snap portion 314 and the second snap portion 201 includes a block 202, the other one of the first snap portion 314 and the second snap portion 201 includes a guiding groove 314a and a fastener groove 314b communicating with the guiding groove 314a, the block 202 is configured for sliding into the fastener groove 314b via the guiding groove 314a to connect the night vision device 20 and the telescopic sight 30. Through the first snap portion 314 and the second snap portion 201, the user is convenient to installed the telescopic sight 30 on the night vision device 20; and the night vision equipment 10 is simple in structure, convenient to use and reasonable in design.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A telescopic sight for detachably connecting a night vision device, comprising:
    a first external barrel comprising at least one opening passing through a side wall of the first external barrel, and an end of the first external barrel configured for detachably connecting the night vision device;
    a regulation element disposed on the first external barrel;
    a first lens module located at an inner side of the first external barrel; and
    a transmission module comprising a transmission element and at least one connection element, the transmission element connected between the regulation element and the at least one connection element, and the at least one connection element passing through the at least one opening and connected between the transmission element and the first lens module,
    wherein when the regulation element is driven by an external force, the regulation element drives the transmission module move along an optical axis of the telescopic sight, such that the at least one connection element slides along the opening and the first lens module moves along the optical axis to regulate focal length of the telescopic sight;
    wherein the regulation element comprises a regulation ring sleeved on the first external barrel, the regulation ring comprises a first inner screw thread, and the transmission element comprises a transmission ring with a first external screw thread coordinated with the first inner screw thread, when the regulation ring rotates around the optical axis O-O, due to the first external screw thread and the first inner screw, the at least one connection element and the first lens module are driven by the transmission element along the optical axis O-O;
    wherein the telescopic sight further comprises a second external barrel, the second external barrel is connected the other end away from the night vision device and configured for connecting a second lens module, the first lens module is an eyepiece module, and the second lens module is an objective module;

wherein the first external barrel comprises a first part, a second part and a third part, the first part is configured for detachably connecting the night vision device, the second part is connected between the first part and the third part, the at least one opening is located at the second part, an end of the second external barrel is sandwiched between the third part and regulation ring, the other end of the second external barrel is configured for connecting the second lens module;

wherein an external surface of the second part comprises a main surface connected to an external surface of the third part, a first connection surface connected to the main surface away from the third part, a first supporting surface connected to the first connection surface away from the main surface, and a second connection surface connected between an external surface of the first part and the first supporting surface, the first connection surface and the main surface form a first restriction groove, the opening passes through the main surface and an inner surface of the second part, the transmission element is located at the first restriction groove, the first supporting surface and the second connection surface forms a second restriction groove, an external surface of the end of the second external barrel comprises a second supporting surface and a third connection surface connected to the second supporting surface, the regulation element is located at the second restriction groove, two ends of the regulation element abut the second connection surface and the third connection surface such that the regulation element is restricted between the second connection surface and the third connection surface.

2. The telescopic sight according to claim 1, wherein the at least one opening extends along the optical axis and is configured for restricting the at least one connection element to move along the optical axis.

3. The telescopic sight according to claim 1, wherein the first lens module comprises an inner barrel and at least one lens disposed in the inner barrel, each connection element comprises a connection pole, the regulation ring comprises a first fixing hole, the inner barrel comprises a second fixing hole, two ends of the connection pole are fixed in the first fixing hole and the second fixing hole respectively.

4. The telescopic sight according to claim 1, wherein the at least one connection element comprises a plurality of connection elements, the at least on opening comprises a plurality of connection openings corresponding to the plurality of connection elements respectively, each connection element passes though the corresponding opening and is connected between the transmission ring and the first lens module.

5. The telescopic sight according to claim 1, wherein the plurality of connection openings are located at an circumference of the first external barrel at equal intervals, the plurality of connection elements are connected to the transmission ring and the first lens module at equal intervals.

6. The telescopic sight according to claim 1, wherein a plurality of skipproof strips are disposed on an external surface of the first external barrel, and each skipproof strip is ring-shaped and perpendicular to the optical axis.

7. The telescopic sight according to claim 1, wherein an external surface of the third part comprises a second external screw thread, the end of the second external barrel comprises a second inner screw thread coordinated with the second external screw thread.

8. The telescopic sight according to claim 7, wherein the other end of the second external barrel comprises a third inner screw thread, and the second lens module comprises a third external screw thread coordinated with the third inner screw thread.

9. The telescopic sight according to claim 7, wherein the telescopic sight comprises a third external barrel, an end of the third external barrel sleeves on the other end of second external barrel, the other end of the third external barrel sleeves on the second lens module.

10. The telescopic sight according to claim 9, wherein a first sealing slot is provided on the first supporting surface, and a first sealing ring is located in the first sealing slot and sandwiched between a bottom surface of the first sealing slot and the regulation ring; a second sealing slot is provided on the second supporting surface, and a second sealing ring is located in the second sealing slot and sandwiched between a bottom surface of the second sealing slot and the regulation ring.

11. The telescopic sight according to claim 9, wherein a third sealing slot is provided on an external surface of the second external barrel, and a third sealing ring is located in the third sealing slot and sandwiched between a bottom surface of the third sealing slot and the third external barrel; a fourth sealing slot is provided on an external surface of the second lens module, and a fourth sealing ring is located in the fourth sealing slot and sandwiched between a bottom surface of the fourth sealing slot and the third external barrel.

12. A night vision equipment comprising:
a night vision device; and
a telescopic sight for detachably connecting the night vision device, the telescopic sight comprising a first external barrel, a regulation element, a first lens module and a transmission module, the first external barrel comprising at least one opening passing through a side wall of the first external barrel, an end of the first external barrel configured for detachably connecting the night vision device; the regulation element disposed on the first external barrel; the first lens module located at an inner side of the first external barrel, the transmission module comprising a transmission element and at least one connection element, the transmission element connected between the regulation element and the at least one connection element, and the at least one connection element passing through the at least one opening and connected between the transmission element and the first lens module, wherein when the regulation element is driven by an external force, the regulation element drives the transmission module move along an optical axis of the telescopic sight, such that the at least one connection element slides along the opening and the first lens module moves along the optical axis to regulate focal length of the telescopic sight;

wherein the regulation element comprises a regulation ring sleeved on the first external barrel, the regulation ring comprises a first inner screw thread, and the transmission element comprises a transmission ring with a first external screw thread coordinated with the first inner screw thread, when the regulation ring rotates around the optical axis O-O, due to the first external screw thread and the first inner screw, the at least one connection element and the first lens module are driven by the transmission element along the optical axis O-O;

wherein the telescopic sight further comprises a second external barrel, the second external barrel is connected the other end away from the night vision device and configured for connecting a second lens module, the first lens module is an eyepiece module, and the second lens module is an objective module;

wherein the first external barrel comprises a first part, a second part and a third part, the first part is configured for detachably connecting the night vision device, the second part is connected between the first part and the third part, the at least one opening is located at the second part, an end of the second external barrel is sandwiched between the third part and regulation ring, the other end of the second external barrel is configured for connecting the second lens module;

wherein an external surface of the second part comprises a main surface connected to an external surface of the third part, a first connection surface connected to the main surface away from the third part, a first supporting surface connected to the first connection surface away from the main surface, and a second connection surface connected between an external surface of the first part and the first supporting surface, the first connection surface and the main surface form a first restriction groove, the opening passes through the main surface and an inner surface of the second part, the transmission element is located at the first restriction groove, the first supporting surface and the second connection surface forms a second restriction groove, an external surface of the end of the second external barrel comprises a second supporting surface and a third connection surface connected to the second supporting surface, the regulation element is located at the second restriction groove, two ends of the regulation element abut the second connection surface and the third connection surface such that the regulation element is restricted between the second connection surface and the third connection surface.

13. The night vision equipment according to claim 12, wherein the first external barrel comprises a first snap portion located at an end of the first external barrel adjacent to the night vision device, the night vision device comprises a second snap portion for detachably connecting the first snap portion, one of the first snap portion and the second snap portion comprises a block, the other one of the first snap portion and the second snap portion comprises a guiding groove and a fastener groove communicating with the guiding groove, the block is configured for sliding into the fastener groove via the guiding groove to connect the night vision device and the telescopic sight.

14. A telescopic sight for detachably connecting a night vision device, comprising:
a first external barrel comprising at least one opening passing through a side wall of the first external barrel, and an end of the first external barrel configured for detachably connecting the night vision device;
a regulation element disposed on the first external barrel;
a first lens module located at an inner side of the first external barrel; and
a transmission module comprising connected between the regulation element and the first lens module via the at least one opening, wherein when the regulation element is driven by an external force, the regulation element drives the transmission module move along an optical axis of the telescopic sight, such that the transmission module drives the first lens module moves along the optical axis to regulate focal length of the telescopic sight;

wherein the regulation element comprises a regulation ring sleeved on the first external barrel, the regulation ring comprises a first inner screw thread, and the transmission element comprises a transmission ring with a first external screw thread coordinated with the first inner screw thread, when the regulation ring rotates around the optical axis O-O, due to the first external screw thread and the first inner screw, the at least one connection element and the first lens module are driven by the transmission element along the optical axis O-O;

wherein the telescopic sight further comprises a second external barrel, the second external barrel is connected the other end away from the night vision device and configured for connecting a second lens module, the first lens module is an eyepiece module, and the second lens module is an objective module;

wherein the first external barrel comprises a first part, a second part and a third part, the first part is configured for detachably connecting the night vision device, the second part is connected between the first part and the third part, the at least one opening is located at the second part, an end of the second external barrel is sandwiched between the third part and regulation ring, the other end of the second external barrel is configured for connecting the second lens module;

wherein an external surface of the second part comprises a main surface connected to an external surface of the third part, a first connection surface connected to the main surface away from the third part, a first supporting surface connected to the first connection surface away from the main surface, and a second connection surface connected between an external surface of the first part and the first supporting surface, the first connection surface and the main surface form a first restriction groove, the opening passes through the main surface and an inner surface of the second part, the transmission element is located at the first restriction groove, the first supporting surface and the second connection surface forms a second restriction groove, an external surface of the end of the second external barrel comprises a second supporting surface and a third connection surface connected to the second supporting surface, the regulation element is located at the second restriction groove, two ends of the regulation element abut the second connection surface and the third connection surface such that the regulation element is restricted between the second connection surface and the third connection surface.

\* \* \* \* \*